(12) United States Patent
Kowalchuk

(10) Patent No.: US 10,806,071 B2
(45) Date of Patent: Oct. 20, 2020

(54) AGRICULTURAL IMPLEMENT HAVING SELF-CONTAINED HOPPERS FOR SINGULATING ROW UNITS

(71) Applicant: CNH Industrial Canada, Ltd., Saskatoon (CA)

(72) Inventor: Trevor Lawrence Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 107 days.

(21) Appl. No.: 15/961,444

(22) Filed: Apr. 24, 2018

(65) Prior Publication Data

US 2019/0320575 A1    Oct. 24, 2019

(51) Int. Cl.
*A01C 7/04* (2006.01)
*A01C 5/06* (2006.01)

(52) U.S. Cl.
CPC .............. *A01C 7/046* (2013.01); *A01C 5/064* (2013.01)

(58) Field of Classification Search
CPC ......... A01C 7/046; A01C 7/044; A01C 7/042; A01C 7/04; A01C 7/00; A01C 5/064; A01C 5/062; A01C 5/06; A01C 5/00
See application file for complete search history.

(56) References Cited

U.S. PATENT DOCUMENTS

| 4,580,508 | A | 4/1986 | Dreyer |
| 4,726,303 | A | 2/1988 | Degelman et al. |
| 5,333,559 | A | 8/1994 | Hodapp et al. |
| 5,406,897 | A | 4/1995 | Pingry |
| 6,092,609 | A | 7/2000 | Jeffery et al. |
| D644,253 | S | 8/2011 | Donadon |
| 8,789,483 | B2 | 7/2014 | Gilstring |
| 8,850,995 | B2 | 10/2014 | Garner et al. |
| 9,451,740 | B2 | 9/2016 | Kowalchuk |
| 2006/0260523 | A1 | 11/2006 | Claydon |
| 2017/0049040 | A1 | 2/2017 | Kinzenbaw |
| 2017/0064902 | A1 | 3/2017 | Jagow et al. |

FOREIGN PATENT DOCUMENTS

| EP | 0349958 | 1/1990 |
| EP | 2514292 | 10/2012 |
| WO | 2007064184 | 6/2007 |
| WO | 2008150239 | 12/2008 |

*Primary Examiner* — Christopher J. Novosad
(74) *Attorney, Agent, or Firm* — Rebecca L. Henkel; Rickard K. DeMille

(57) ABSTRACT

An agricultural implement includes a frame, a row unit coupled to the frame, and a hopper coupled to the frame independently of the row unit. The hopper is configured to store an agricultural product, and the hopper is not configured to receive the agricultural product from a supply container coupled to the agricultural implement. The agricultural implement also includes a meter configured to receive the agricultural product from the hopper via movement of the agricultural product under the influence of gravity from the hopper to the meter. The meter is configured to output substantially singulated particles of the agricultural product, the row unit includes a ground-engaging tool configured to open a trench within soil, and the row unit includes a product tube configured to receive the substantially singulated particles of the agricultural product from the meter and to direct the substantially singulated particles toward the trench.

20 Claims, 5 Drawing Sheets

AGRICULTURAL IMPLEMENT HAVING SELF-CONTAINED HOPPERS FOR SINGULATING ROW UNITS

BACKGROUND

The present disclosure relates generally to an agricultural implement having self-contained hoppers for singulating row units.

Generally, seeding implements (e.g., seeders) are towed behind a tractor or other work vehicle to deposit agricultural product (e.g., seeds, fertilizer, etc.) throughout an agricultural field. Seeding implements typically include multiple row units distributed throughout the implement. Each row unit is configured to deposit the agricultural product at a target depth beneath a soil surface of the field (e.g., to establish rows of planted seeds). Each row unit typically includes a ground-engaging tool or opener that forms a trench for agricultural product deposition into the soil. A product tube (e.g., coupled to the ground-engaging tool) is configured to deposit the agricultural product into the trench. The ground-engaging tool/product tube may be followed by closing discs that move displaced soil back into the trench and/or a packer wheel that packs the soil on top of the deposited agricultural product.

In certain configurations, a pneumatic delivery system is used to meter and deliver agricultural product (e.g., seeds, fertilizer, etc.) to the row units of the seeding implement. The pneumatic delivery system generally includes a storage tank (e.g., a pressurized tank), an air source (e.g., a blower), and a metering system. The agricultural product is typically gravity fed from the storage tank to the metering system which distributes a selected volume of agricultural product into an air flow generated by the air source. The air flow carries the agricultural product to the row units via conduits extending between the metering system and the seeding implement. The metering system typically includes meter rollers that control the flow of agricultural product based on meter roller geometry and rotation rate.

Because the agricultural product is metered at the storage tank, the placement of the agricultural product within the field may not be as accurate as agricultural product deposited by a planting implement that utilizes precision on-row meters. However, planting implements are typically significantly more expensive than seeding implements. Accordingly, if depositing agricultural product that may benefit from accurate placement (e.g., canola seed) within a small portion of a field is desired, it may not be economically justifiable to purchase a planting implement. Accordingly, a seeding implement may be used to plant such agricultural product (e.g., canola seed) with a resultant reduction in yield.

BRIEF DESCRIPTION

In certain embodiments, an agricultural implement includes a frame, a singulating row unit coupled to the frame, and a self-contained hopper coupled to the frame independently of the singulating row unit. The self-contained hopper is configured to store an agricultural product, and the self-contained hopper is not configured to receive the agricultural product from a supply container coupled to the agricultural implement. The agricultural implement also includes a singulating meter configured to receive the agricultural product from the self-contained hopper via movement of the agricultural product under the influence of gravity from the self-contained hopper to the singulating meter. The singulating meter is configured to output substantially singulated particles of the agricultural product, the singulating row unit includes a ground-engaging tool configured to open a trench within soil, and the singulating row unit includes a product tube configured to receive the substantially singulated particles of the agricultural product from the singulating meter and to direct the substantially singulated particles of the agricultural product toward the trench.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
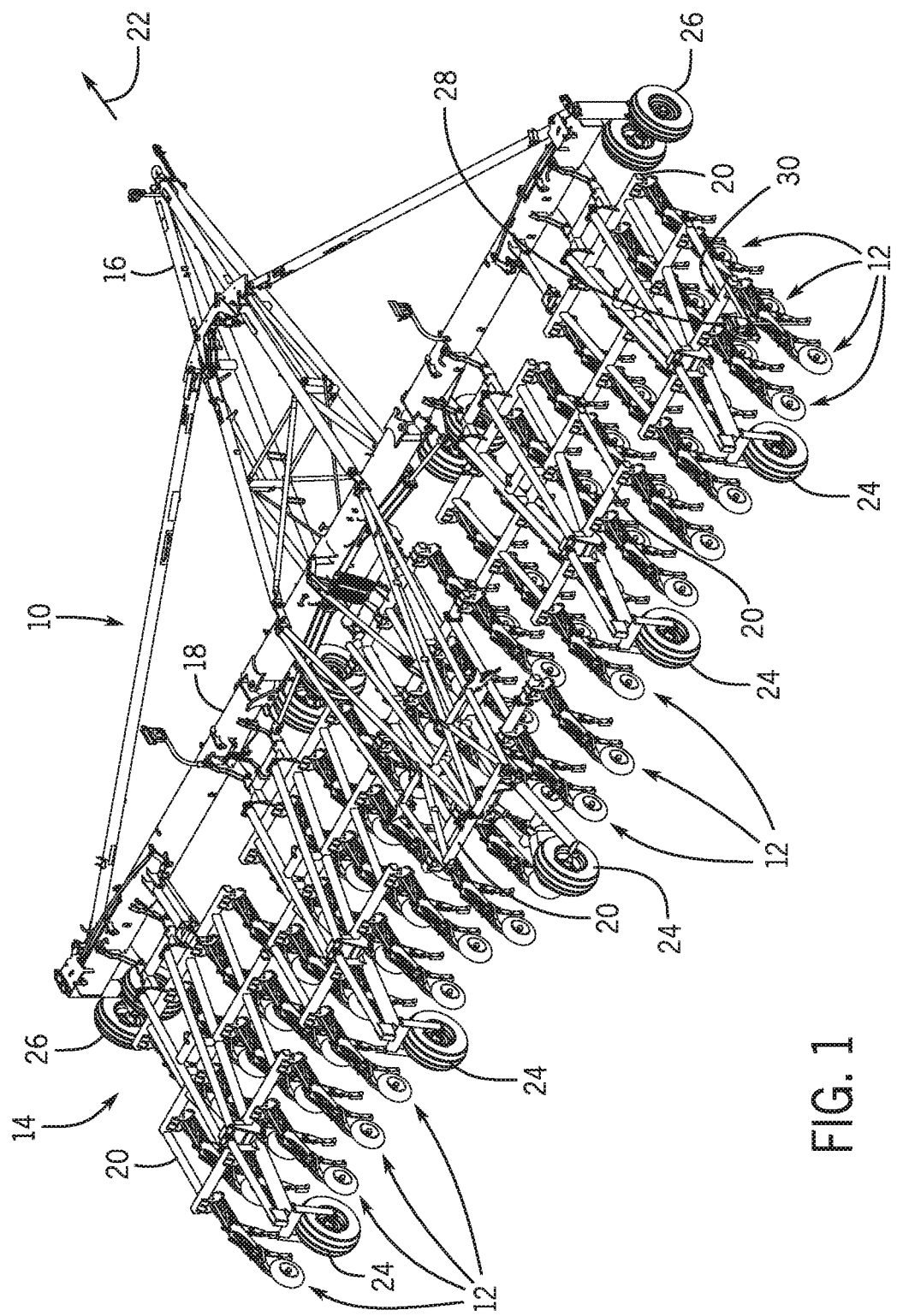
FIG. 1 is a perspective view of an embodiment of an agricultural implement having multiple singulating row units distributed throughout the agricultural implement.

FIG. 1 is a perspective view of an embodiment of an agricultural implement 10 having multiple singulating row units 12 distributed throughout the agricultural implement 10. In the illustrated embodiment, the agricultural implement includes a frame 14 having a hitch assembly 16, a toolbar 18, and tool frames 20. The hitch assembly 16 is configured to couple to a hitch of a work vehicle (e.g., a tractor) to enable the work vehicle to move the agricultural implement 10 along a direction of travel 22. The hitch assembly 16 is coupled to the toolbar 18, and the toolbar 18 is coupled to the tool frames 20. As illustrated, each tool frame 20 is supported by a respective wheel 24, and the toolbar 18 is supported by multiple wheels 26. In certain embodiments, each tool frame is rotatably coupled to the toolbar to enable the tool frame to follow contours of the soil surface. In the illustrated embodiment, each singulating row unit 12 is coupled to a frame element of a tool frame 20, thereby coupling each singulating row unit 12 to the frame 14 of the agricultural implement 10. While the illustrated agricultural implement frame 14 includes the toolbar 18 and the tool frames 20, in other embodiments, the frame may include other and/or additional frame elements to support the singulating row units. For example, in certain embodiments, the tool frames may be omitted, and the singulating row units may be directly coupled to the toolbar.

As discussed in detail below, the agricultural implement 10 includes multiple self-contained hoppers 28 coupled to the frame 14 independently of the singulating row units 12. Each self-contained hopper 28 is configured to store an agricultural product, and each self-contained hopper 28 is not configured to receive the agricultural product from a supply container coupled to the agricultural implement 10. In addition, the agricultural implement 10 includes multiple singulating meters 30, and each singulating meter 30 is configured to receive the agricultural product from a self-contained hopper 28 via movement of the agricultural product under the influence of gravity from the self-contained hopper 28 to the singulating meter 30. Each singulating meter 30 is also configured to output substantially singulated particles of the agricultural product to a singulating row unit 12. As discussed in detail below, each singulating row unit 12 includes a ground-engaging tool (e.g., opener, disc blade, etc.) configured to open a trench within the soil. Each singulating row unit 12 also includes a product tube configured to receive the substantially singulated particles of the agricultural product from the singulating meter and to direct the substantially singulated particles toward/into the trench. Accordingly, multiple rows of deposited agricultural product may be formed as the agricultural implement 10 traverses a field along the direction of travel 22. A single self-contained hopper 28 and a single singulating meter 30 are shown on the illustrated agricultural implement 10 for clarity. However, multiple self-contained hoppers 28 and singulating meters 30 may be distributed throughout the frame 14 of the agricultural implement 10. For example, in certain embodiments, each singulating row unit may receive the substantially singulated particles of the agricultural product from a respective singulating meter, and each singulating meter may receive the agricultural product from a respective self-contained hopper.

Because the self-contained hoppers 28 are mounted to the frame 14 of the agricultural implement 10, each singulating row unit may be significantly less expensive to manufacture than a planter row unit that includes a hopper mounted to a frame of the row unit (e.g., due to significant simplification of the row unit). Furthermore, because each singulating row unit is configured to receive the agricultural product from a singulating meter, the placement of the agricultural product within the soil may be more accurate than a seeding implement that employs one or more centralized meters and a pneumatic distribution system to convey the agricultural product from the centralized meter(s) to the row units. In addition, because the agricultural product is stored within self-contained hoppers 28 coupled to the frame 14 of the agricultural implement 10, the manufacturing cost of the implement 10 may be less than an implement that employs a nurse system (e.g., pneumatic nurse system) to convey the agricultural product from a centralized supply container to row unit meters. Coupling the self-contained hoppers 28 to the frame 14 of the agricultural implement 10 proximate to the respective singulating row units 12 may also increase the weight on the implement frame 14 at the singulating row units 12 (e.g., as compared to an implement that includes a centralized supply container positioned remote from the row units), thereby urging the ground-engaging tools of the singulating row units into the soil (e.g., without assistance from toolbar-to-tool frame actuators). For example, the weight of the self-contained hoppers 28 and the weight of the agricultural product within the self-contained hoppers 28 may drive each tool frame 20 of the agricultural implement 10 to rotate downwardly relative to the toolbar 18, thereby driving the ground-engaging tools of the singulating row units 12 into the soil. Moreover, because the agricultural product flows under the influence of gravity from the self-contained hoppers 28 to the singulating meters 30, the costs associated with maintaining the agricultural implement 10 may be significantly less than the costs associated with maintaining an implement that utilizes a nurse system (e.g., pneumatic nurse system) to convey the agricultural product from a centralized supply container to row unit meters.

In certain embodiments, each row unit of the agricultural implement is a singulating row unit configured to receive substantially singulated particles of the agricultural product from a singulating meter. However, in other embodiments, at least one row unit may be configured to receive agricultural product (e.g., a second/different agricultural product) from a centralized storage compartment via a pneumatic distribution system. For example, one row of row units may be configured to receive fertilizer from a centralized storage compartment via a pneumatic distribution system, and a second row of singulating row units may be configured to receive singulated seed from singulating meters.

Figure 2:
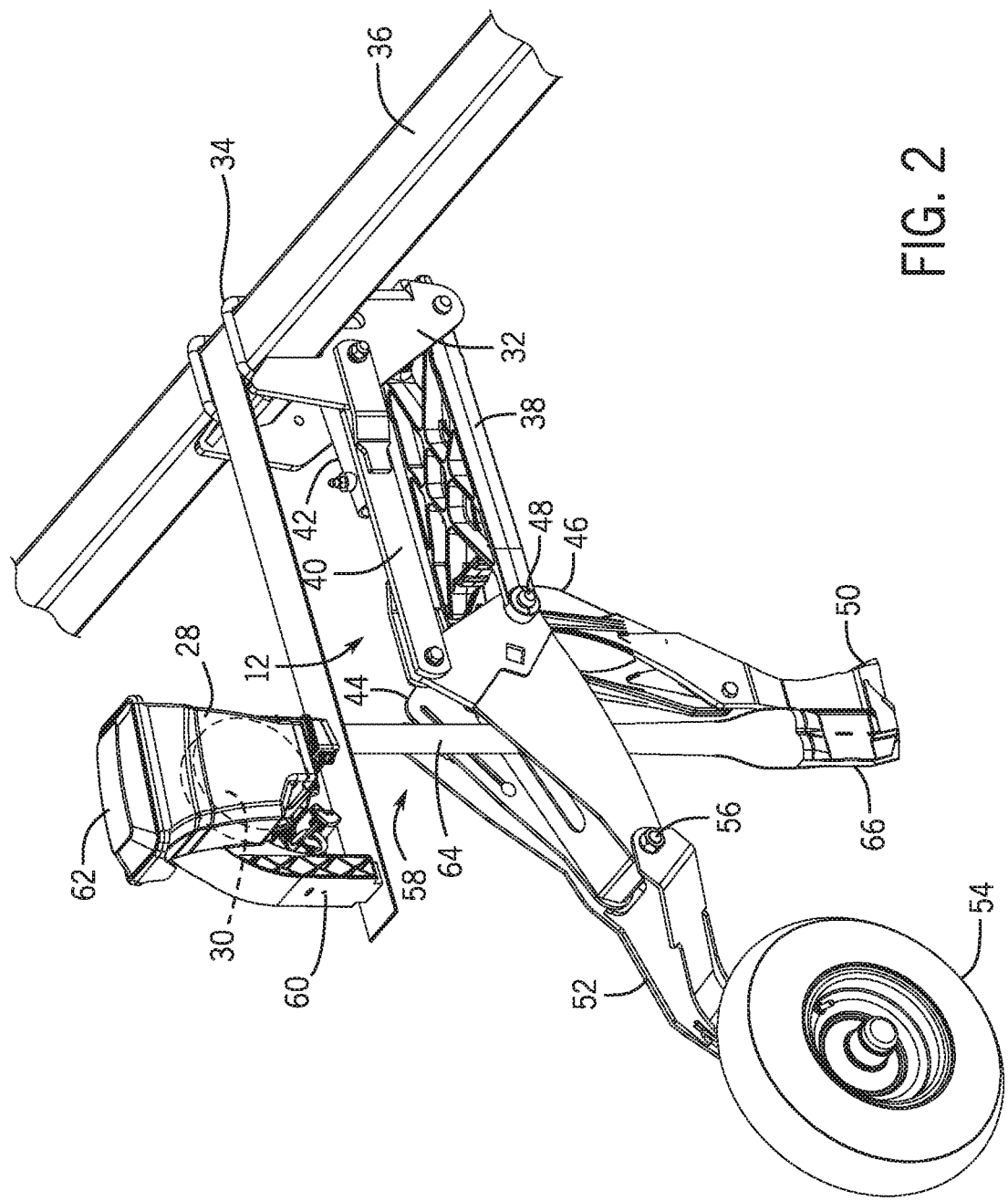
FIG. 2 is a perspective view of an embodiment of a singulating row unit that may be employed on the agricultural implement of FIG. 1.

FIG. 2 is a perspective view of an embodiment of a singulating row unit 12 that may be employed on the agricultural implement of FIG. 1. As illustrated, the singulating row unit 12 includes a frame support 32 and mounting brackets 34. The frame support 32 and mounting brackets 34 are configured to interface with a frame element 36 of the tool frame, thereby securing the singulating row unit 12 to the agricultural implement frame. While the illustrated embodiment includes two mounting brackets 34, in other embodiments, the singulating row unit may include more or fewer mounting brackets (e.g., 1, 2, 3, 4, 5, 6, or more). Furthermore, while the illustrated singulating row unit 12 is coupled to the agricultural implement frame by the frame support 32 and the mounting brackets 34, in other embodiments, the singulating row unit may be coupled to the agricultural implement frame by any other suitable connection system (e.g., fasteners, a welded connection, an adhesive connection, etc.).

In addition, the singulating row unit 12 includes a first linkage member 38, a second linkage member 40, and a biasing device, such as the illustrated cylinder 42 (e.g., hydraulic or pneumatic piston-cylinder assembly). As illustrated, the first linkage member 38 and the second linkage member 40 extend from the frame support 32 to a packer support structure 44. The first linkage member 38 is pivotally coupled to the frame support 32 and to the packer support structure 44, and the second linkage member 40 is pivotally coupled to the frame support 32 and to the packer support structure 44. Accordingly, the first and second linkage members form a linkage (e.g., parallel linkage) between the frame support 32 and the packer support structure 44. While the linkage is formed by the first and second linkage members in the illustrated embodiment, in other embodiments, the packer support structure may be coupled to the frame support by any other suitable type of linkage.

The cylinder 42 is pivotally coupled to the frame support 32 and to a shank 46. In addition, the shank 46 is pivotally coupled to the first linkage member 38 and to the packer support structure 44 by a pivot joint 48. A ground-engaging tool, such as the illustrated opener 50, is coupled to the shank 46 and configured to engage the soil. Applying pressurized fluid (e.g., hydraulic fluid, air, etc.) to the cylinder 42 urges the shank 46 to rotate about the pivot joint 48, thereby urging the opener 50 into engagement with the soil. In addition, applying pressurized fluid to the cylinder 42 urges the packer support structure 44 to move downwardly due to contact between the shank 46 and the packer support structure 44. Downward movement of the packer support structure 44 and the shank 46/opener 50 is controlled by the linkage. For example, the linkage may cause the packer support structure 44 and the shank 46/opener 50 to move along a substantially vertical axis. While the illustrated embodiment utilizes a cylinder 42 as the biasing member, in alternative embodiments, the singulating row unit may include another suitable type of biasing member, such as a spring or a pneumatic strut, for example.

In the illustrated embodiment, a packer arm 52 is pivotally coupled to the packer support structure 44, and a packer wheel 54 is rotatably coupled to the packer arm 52. The packer wheel 54 rotates along the soil surface to both pack the soil on top of deposited agricultural product and to control the penetration depth of the opener 50. As illustrated, a pin 56 disposed through openings within the packer arm 52 and the packer support structure 44 enables rotation of the packer arm 52 with respect to the packer support structure 44. However, in a working mode, rotation of the packer arm 52 relative to the packer support structure 44 is blocked by a depth adjustment assembly 58. The depth adjustment assembly 58 includes a fastener disposed within a slot in the packer support structure 44 and a corresponding slot within the packer arm 52. While in a locked configuration, the fastener blocks rotation of the packer arm 52 with respect to the packer support structure 44. Conversely, while in an unlocked configuration, the fastener may be translated within the respective slots to adjust the rotation of the packer arm 52 about the pin 56. Adjusting the rotation of the packer arm 52 relative to the packer support structure 44 controls the vertical position of the opener 50 relative to the packer wheel 54, thereby controlling the penetration depth of the opener 50. Once a target penetration depth has been established, the fastener may be transitioned to the locked configuration, thereby blocking rotation of the packer arm 52 and enabling the singulating row unit 12 to enter the working mode.

While the illustrated depth adjustment assembly includes a fastener disposed within respective slots in the packer support structure and the packer arm, in further embodiments, other suitable types of depth adjustment assemblies may be utilized. For example, in certain embodiments, the depth adjustment assembly may include a pin configured to be disposed within respective openings in the packer support structure and the packer arm. At least one of the packer support structure and the packer arm may include multiple openings, and the position of the opener relative to the packer wheel may be controlled by disposing the pin within a selected opening of multiple openings in the packer support structure and/or within a selected opening of multiple openings in the packer arm. In further embodiments, the depth adjustment assembly may include a cam and a stopper. The position of the opener relative to the packer wheel may be controlled by rotating the cam, and the stopper may selectively block rotation of the cam to maintain the opener in the selected position. Furthermore, while the illustrated singulating row unit 12 includes a packer wheel, in other embodiments, the packer wheel may be omitted, and the depth of the opener may be controlled by an actuator (e.g., the cylinder).

In the illustrated embodiment, the singulating row unit 12 is configured to receive agricultural product from a respective self-contained hopper 28 and a respective singulating meter 30. In the illustrated embodiment, the self-contained hopper 28 is coupled to a support member 60, and the support member 60 is coupled to the frame element 36. Accordingly, the self-contained hopper 28 is coupled to the frame of the agricultural implement independently of the singulating row unit 12. As used herein, "independently" coupled refers to two elements coupled to the frame, in which one element is not supported by the other element (e.g., even if both elements are coupled to the frame by a common mount). In the illustrated embodiment, the self-contained hopper 28 is not supported by the singulating row unit 12. Instead, both the self-contained hopper 28 and the singulating row unit 12 are supported by the frame of the agricultural implement. Furthermore, in the illustrated embodiment, the singulating meter 30 is coupled to the support member 60, such that the support member 60 couples the singulating meter 30 to the frame of the agricultural implement independently of the singulating row unit 12. While the illustrate embodiment utilizes a support member 60 to couple the self-contained hopper 28 and the singulating meter 30 to the frame of the agricultural implement, in further embodiments, other and/or additional assemblies/devices may be used to couple the self-contained hopper and/or the singulating meter to the agricultural implement frame. For example, in certain embodiments, the self-contained hopper may be coupled to the agricultural implement frame by the support member, and the singulating meter may be coupled to the self-contained hopper (e.g., and not directly coupled to the support member). In further embodiments, the singulating meter may be coupled to the agricultural implement frame by the support member, and the self-contained hopper may be coupled to the singulating meter (e.g., and not directly coupled to the support member). Furthermore, in certain embodiments, the support member may be omitted, and the self-contained hopper and/or the singulating meter may be coupled directly to the agricultural implement frame (e.g., the frame element of the agricultural implement frame). For example, the self-contained hopper may be directly coupled to the agricultural implement frame, and the singulating meter may be coupled to the self-contained hopper. Or, the singulating meter may be directly coupled to the agricultural implement frame, and the self-contained hopper may be coupled to the singulating meter.

The self-contained hopper 28 is configured to store the agricultural product, and the self-contained hopper 28 is not configured to receive the agricultural product from a supply container coupled to the agricultural implement (e.g., a supply container coupled to the frame of the agricultural implement, a supply container coupled to an air cart that is coupled to the agricultural implement via an hitch assembly, etc.). In the illustrated embodiment, the self-contained hopper 28 includes a lid 62. The agricultural product may be disposed within the self-contained hopper 28 by lifting or removing the lid 62 and pouring the agricultural product (e.g., from a bag) through an opening that is exposed by lifting/removing the lid. In certain embodiments, the opening selectively covered by the lid is the only opening configured to receive agricultural product. The self-contained hopper does not include an opening configured to receive agricultural product from a nurse system (e.g., pneumatic nurse system) that conveys agricultural product from a product source (e.g., supply container). As such, agricultural product may only be disposed within the self-contained hopper 28 by pouring the agricultural product under the influence of gravity through an opening (e.g., on top of the self-contained hopper and/or which may be selectively covered by a lid). For example, the agricultural product may only be poured into the self-contained hopper 28 while the agricultural implement is not in operation.

The self-contained hopper 28 also includes an outlet configured to enable the agricultural product to flow from the self-contained hopper 28 to the singulating meter 30 under the influence of gravity. As used herein, flow/movement of the agricultural product "under the influence of gravity" refers to an agricultural product flow that is only or substantially driven by the force of gravity. Flow/movement of agricultural product "under the influence of gravity" does not include an agricultural product flow that is driven by a pneumatic/air source, even if the flow is partially influenced by gravity (e.g., a portion of the flow path is "downhill"). The singulating meter 30 is configured to receive the agricultural product from the self-contained hopper 28 via movement of the agricultural product under the influence of gravity from the self-contained hopper 28 to the singulating meter 30. In addition, the singulating meter 30 is configured to output substantially singulated particles of the agricultural product. As used herein, "substantially singulated" refers to a group/flow of particles, in which most of the particles are separated from one other (e.g., by a distance greater than ten times the width/diameter of each particle). For example, the singulating meter 30 may output individual/single particles (e.g., output one particle at a time) during a substantial portion of the metering operations (e.g., more than 90 percent of the time, more than 95 percent of the time, more than 98 percent of the time, or more than 99 percent of the time) to generate substantially singulated particles.

In the illustrated embodiment, the singulating meter 30 is a vacuum meter. In certain embodiments, the vacuum meter includes a disc having multiple openings. An air pressure differential between opposite sides of the disc induces an individual particle of the agricultural product (e.g., one seed) to be captured within each opening. As the disc rotates, each particle of the agricultural product is conveyed toward an outlet tube 64. When the agricultural product particle (e.g., seed) is aligned with an inlet to the outlet tube 64, the air pressure on each side of the disc is substantially equalized (e.g., at the end of a vacuum passage), thereby enabling the agricultural product particle (e.g., seed) to enter the outlet tube 64. The outlet tube 64 directs substantially singulated particles of the agricultural product to a product tube 66 of the singulating row unit 12, which directs the substantially singulated particles of the agricultural product toward/into the trench formed by the opener 50. In the illustrated embodiment, the product tube 66 is coupled to the opener 50. However, in other embodiments, the product tube may be positioned at any suitable location behind the opener. While the illustrated singulating meter is a vacuum meter, in alternative embodiments, other suitable singulating agricultural product meters may be utilized. As used herein, "vacuum" refers to an air pressure that is less than the ambient atmospheric air pressure, and not necessarily 0 pa.

In the illustrated embodiment, the singulating meter 30 is positioned substantially directly above the product tube 66. Accordingly, the substantially singulated particles of the agricultural product flow under the influence of gravity from the singulating meter 30 to the product tube 66 via the outlet tube 64. However, in alternative embodiments, the singulating meter may be positioned remote from the product tube (e.g., the self-contained hopper and/or the singulating meter may be positioned on an opposite side of the frame element from the product tube). In such embodiments, a fan or a blower may be utilized to convey the substantially singulated particles of the agricultural product from the singulating meter to the product tube.

Because the self-contained hoppers 28 are mounted to the frame of the agricultural implement, each singulating row unit may be significantly less expensive to manufacture than a planter row unit that includes a hopper mounted to a frame of the row unit (e.g., due to significant simplification of the row unit). Furthermore, because each singulating row unit is configured to receive the agricultural product from a singulating meter, the placement of the agricultural product within the soil may be more accurate than a seeding implement that employs one or more centralized meters and a pneumatic distribution system to convey the agricultural product from the centralized meter(s) to the row units. In addition, because the agricultural product is stored within self-contained hoppers 28 coupled to the frame of the agricultural implement, the manufacturing cost of the implement may be less than an implement that employs a nurse system (e.g., pneumatic nurse system) to convey the agricultural product from a centralized supply container to row unit meters.

Figure 3:
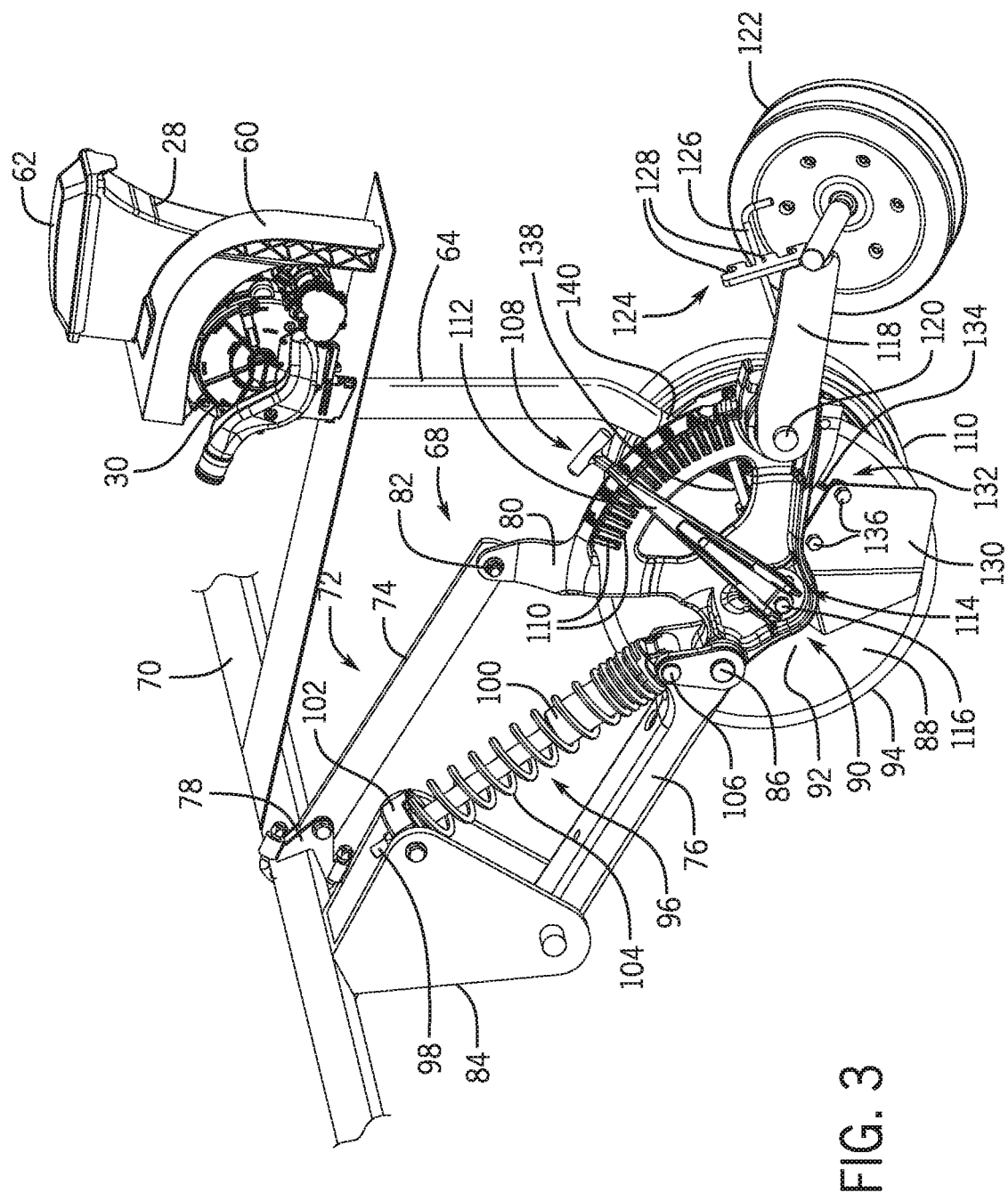
FIG. 3 is a perspective view of another embodiment of a singulating row unit that may be employed on the agricultural implement of FIG. 1.

FIG. 3 is a perspective view of another embodiment of a singulating row unit 68 that may be employed on the agricultural implement of FIG. 1. In the illustrated embodiment, the singulating row unit 68 is coupled to a frame element 70 of an agricultural implement frame via a linkage assembly 72 (e.g., parallel linkage assembly). The linkage assembly 72 is formed by an upper link 74 and a lower link 76. As illustrated, a first end of the upper link 74 is rotatably coupled to a mount 78, which is coupled to the frame element 70, and a second end of the upper link 74 is rotatably coupled to a support structure 80 by a fastener 82. In addition, a first end of the lower link 76 is rotatably coupled to an extension 84, which is coupled to the frame element 70, and a second end of the lower link 76 is rotatably coupled to the support structure 80 by a fastener 86. The fasteners 82, 86 and the linkage assembly 72 enable the support structure 80 to raise and lower (e.g., move vertically) relative to the agricultural implement frame in response to encountering obstructions and/or variations in the terrain. While the linkage is formed by the upper and lower links in the illustrated embodiment, in other embodiments, the support structure 80 may be coupled to the agricultural implement frame by any other suitable type of linkage.

The singulating row unit 68 also includes a disc 88 (e.g., disc blade, coulter, etc.) rotatably coupled to the support structure 80 by a bearing assembly 90. The bearing assembly 90 enables the disc 88 to freely rotate as the disc engages the soil and excavates a trench. The disc 88 includes a central portion 92 and an outer portion 94. The central portion 92 includes the region that couples to the bearing assembly 90, and the outer portion 94 has a sharpened edge for penetrating the soil. However, other disc shapes/configurations may be utilized in alternative embodiments.

In the illustrated embodiment, the singulating row unit 68 includes a spring assembly 96. The spring assembly 96 includes a bolt/tube assembly 98 that connects a lower trunnion 100 to an upper trunnion 102. The upper trunnion 102 is coupled to the extension 84, thereby coupling the bolt/tube assembly 98 to the frame element 70. The bolt/tube assembly 98 and the lower trunnion 100 are surrounded by a compression spring 104. In certain embodiments, an actuator (e.g., a hydraulic actuator, a pneumatic actuator, etc.) is configured to urge the frame element 70 downwardly, thereby compressing the compression spring 104. The pressure applied by the actuator may be adjusted to control the spring compression, thereby controlling a force applied by the singulating row unit 12 to the soil surface. The spring 104 is configured to compress to enable the disc 88 to move upwardly in response to encountering an obstruction and/or variations in the terrain. For example, upward movement of the disc 88 and the support structure 80 may be substantially directed along the vertical axis by the linkage assembly 72. As illustrated, the spring assembly 96 is rotatably coupled to the lower link 76 by a fastener 106 to enable the spring assembly 96 to rotate relative to the lower link 76. While the illustrated singulating row unit 68 utilizes a spring assembly to urge the disc 88 into the soil, in other embodiments, the singulating row unit may employ another suitable type of biasing member, such as a hydraulic cylinder, a pneumatic cylinder, or a pneumatic strut.

In the illustrated embodiment, the singulating row unit 68 includes a depth adjustment assembly 108 having depth gauge notches 110 and a depth adjustment arm 112. The depth adjustment assembly 108 is configured to adjust a height of a gauge wheel 110 relative to the disc 88. The depth adjustment arm 112 may be moved to any of the depth gauge notches 110 to control the height of the gauge wheel 110 relative to the disc 88. Because the gauge wheel 110 travels along the surface of the soil, varying the height of the gauge wheel 110 controls the penetration depth of the disc 88 into the soil. In certain embodiments, the gauge wheel 110 is positioned against the disc 88 to remove soil from the side of the disc 88 during operation. The depth adjustment arm 112 is rotatably coupled to the support structure 80 by a spindle 114 and a fastener 116 that together enable the depth adjustment arm 112 to be moved among the depth gauge notches 110. Furthermore, the spindle 114 couples the depth adjustment arm 112 to the gauge wheel 110.

A support arm 118 is rotatably coupled to the support structure 80 by a fastener 120. A packer wheel 122 is rotatably coupled to the support arm 118 and configured to pack soil onto the agricultural product placed within the trench. The force applied to the packer wheel 122 may be adjusted via an adjustment assembly 124. The adjustment assembly 124 includes a torsion spring 126 that may be moved between notches 128 to set a target force applied by the packer wheel 122. In alternative embodiments, the singulating row unit may include another suitable type of adjustment assembly or the adjustment assembly may be omitted. Furthermore, in certain embodiments, the packer wheel may be omitted.

The singulating row unit 68 also includes a scraper 130 disposed adjacent to the disc 88 and configured to remove accumulated soil from the disc 88. In the illustrated embodiment, a mounting portion 132 of the scraper 130 is rigidly coupled to a mounting bracket 134 by fasteners 136. In alternative embodiments, the scraper may be coupled directly to the support structure, or the scraper may be mounted using any other mounting structure. The mounting bracket 134 is pivotally coupled by a shaft 138 to the support structure 80. While the illustrated singulating row unit includes a scraper, in other embodiments, the scraper may be omitted.

In the illustrated embodiment, the singulating row unit 68 is configured to receive agricultural product from a respective self-contained hopper 28 and a respective singulating meter 30. In the illustrated embodiment, the self-contained hopper 28 is coupled to a support member 60, and the support member 60 is coupled to the frame element 70. Accordingly, the self-contained hopper 28 is coupled to the frame of the agricultural implement independently of the singulating row unit 68. As such, the self-contained hopper 28 is not supported by the singulating row unit 68. Instead, both the self-contained hopper 28 and the singulating row unit 68 are supported by the frame of the agricultural implement. Furthermore, in the illustrated embodiment, the singulating meter 30 is coupled to the support member 60, such that the support member 60 couples the singulating meter 30 to the frame of the agricultural implement independently of the singulating row unit 68.

The self-contained hopper 28 is configured to store the agricultural product, and the self-contained hopper 28 is not configured to receive the agricultural product from a supply container coupled to the agricultural implement. In the illustrated embodiment, the self-contained hopper 28 includes a lid 62. The agricultural product may be disposed within the self-contained hopper 28 by lifting or removing the lid 62 and pouring the agricultural product (e.g., from a bag) through an opening that is exposed by lifting/removing the lid. In certain embodiments, the opening selectively covered by the lid is the only opening configured to receive agricultural product. The self-contained hopper does not include an opening configured to receive agricultural product from a nurse system (e.g., pneumatic nurse system) that conveys agricultural product from a product source (e.g., supply container). As such, agricultural product may only be disposed within the self-contained hopper 28 by pouring the agricultural product under the influence of gravity through an opening (e.g., on top of the self-contained hopper and/or which may be selectively covered by a lid). For example, the agricultural product may only be poured into the self-contained hopper 28 while the agricultural implement is not in operation.

The self-contained hopper 28 also includes an outlet configured to enable the agricultural product to flow from the self-contained hopper 28 to the singulating meter 30 under the influence of gravity. The singulating meter 30 is configured to receive the agricultural product from the self-contained hopper 28 via movement of the agricultural product under the influence of gravity. In addition, the singulating meter 30 is configured to output substantially singulated particles of the agricultural product.

In the illustrated embodiment, the singulating meter 30 is a vacuum meter. In certain embodiments, the vacuum meter includes a disc having multiple openings. An air pressure differential between opposite sides of the disc induces an individual particle of the agricultural product (e.g., one seed) to be captured within each opening. As the disc rotates, each particle of the agricultural product is conveyed toward an outlet tube 64. When the agricultural product particle (e.g., seed) is aligned with an inlet to the outlet tube 64, the air pressure on each side of the disc is substantially equalized (e.g., at the end of a vacuum passage), thereby enabling the agricultural product particle (e.g., seed) to enter the outlet tube 64. The outlet tube 64 directs substantially singulated particles of the agricultural product to a product tube 140 of the singulating row unit 68, which directs the substantially singulated particles of the agricultural product toward/into the trench formed by the opener disc 88. In the illustrated embodiment, the product tube 140 is positioned adjacent to the disc 88. However, in other embodiments, the product tube may be positioned at a suitable location behind the disc. While the illustrated singulating meter is a vacuum meter, in alternative embodiments, other suitable singulating agricultural product meters may be utilized.

In the illustrated embodiment, the singulating meter 30 is positioned substantially directly above the product tube 140. Accordingly, the substantially singulated particles of the agricultural product flow under the influence of gravity from the singulating meter 30 to the product tube 140 via the outlet tube 64. However, in alternative embodiments, the singulating meter may be positioned remote from the product tube (e.g., the self-contained hopper and/or the singulating meter may be positioned on an opposite side of the frame element from the product tube). In such embodiments, a fan or a blower may be utilized to convey the substantially singulated particles of the agricultural product from the singulating meter to the product tube.

Because the self-contained hoppers 28 are mounted to the frame of the agricultural implement, each singulating row unit may be significantly less expensive to manufacture than a planter row unit that includes a hopper mounted to a frame of the row unit (e.g., due to significant simplification of the row unit). Furthermore, because each singulating row unit is configured to receive the agricultural product from a singulating meter, the placement of the agricultural product within the soil may be more accurate than a seeding implement that employs one or more centralized meters and a pneumatic distribution system to convey the agricultural product from the centralized meter(s) to the row units. In addition, because the agricultural product is stored within self-contained hoppers 28 coupled to the frame of the agricultural implement, the manufacturing cost of the implement may be less than an implement that employs a nurse system (e.g., pneumatic nurse system) to convey the agricultural product from a centralized supply container to row unit meters. In certain embodiments, the agricultural implement may include singulating row units of the type described above with reference to FIG. 2, singulating row units of the type described above with reference to FIG. 3, or any combination thereof, among other suitable types of singulating row units.

Figure 4:
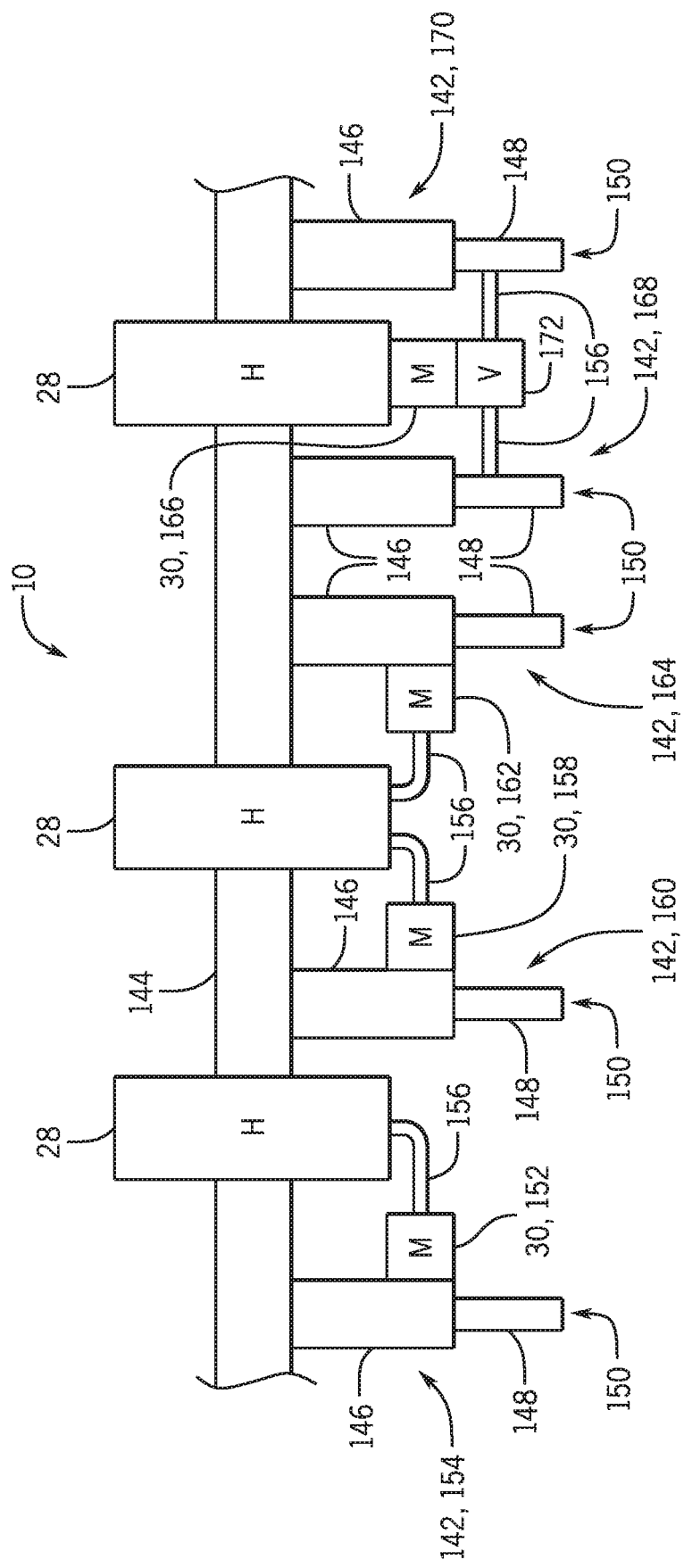
FIG. 4 is a schematic diagram of an embodiment of an agricultural implement having multiple singulating row units arranged along a frame element of the agricultural implement.

FIG. 4 is a schematic diagram of an embodiment of an agricultural implement 10 having multiple singulating row units 142 arranged along a frame element 144 of a frame of the agricultural implement 10. Each row unit 142 may be the type described above with reference to FIG. 2, the type described above with reference to FIG. 3, or any other suitable type of singulating row unit. As illustrated, each singulating row unit 142 is coupled to the frame element 144 of the agricultural implement frame by a linkage assembly 146 of the singulating row unit. In addition, each singulating row unit 142 includes a ground-engaging tool 148 and a product tube 150. Each ground-engaging tool (e.g., opener, disc blade, etc.) is configured to open a trench within the soil, and the product tube 150 is configured to receive substantially singulated particles of the agricultural product from a singulating meter and to direct the substantially singulated particles of the agricultural product to the trench.

In addition, the agricultural implement 10 includes self-contained hoppers 28 coupled to the frame element 144 of the agricultural implement frame independently of the singulating row units 142. As previously discussed, each self-contained hopper 28 is configured to store agricultural product, and each self-contained hopper 28 is not configured to receive the agricultural product from a supply container coupled to the agricultural implement. In addition, each self-contained hopper 28 includes an outlet configured to enable the agricultural product to flow from the self-contained hopper 28 to the singulating meter 30 under the influence of gravity.

In the illustrated embodiment, a first singulating meter 152 is coupled to a first singulating row unit 154. For example, the first singulating meter may be coupled to a frame, a linkage member, a support, or any other suitable structural element of the first singulating row unit. The first singulating meter 152 is configured to receive the agricultural product from a corresponding self-contained hopper via movement of the agricultural product under the influence of gravity from the self-contained hopper 28 to the first singulating meter 152. In the illustrated embodiment, a delivery tube 156 extends from the outlet of the self-contained hopper 28 to an inlet of the first singulating meter 152. During operation of the agricultural implement 10, the first singulating meter 152 receives the agricultural product from the self-contained hopper 28, and the first singulating meter 152 outputs substantially singulated particles of the agricultural product to the product tube 150 of the first singulating row unit 154. The product tube 150, in turn, directs the substantially singulated particles of the agricultural product toward the trench. Coupling the singulating meter 30 to the singulating row unit 142 enables the self-contained hopper 28 to be positioned remote from the singulating meter 152 while maintaining the accuracy of seed placement within the soil. As a result, the size of the support member that couples the self-contained hopper to the frame element may be reduced, or the support member may be omitted, thereby reducing the cost and/or complexity of the agricultural implement.

In the illustrated embodiment, a second singulating meter 158 is coupled to a second singulating row unit 160, and a third singulating meter 162 is coupled to a third singulating row unit 164. For example, each singulating meter may be coupled to a frame, a linkage member, a support, or any other suitable structural element of the respective singulating row unit. The second singulating meter 158 and the third singulating meter 162 are configured to receive the agricultural product from a common self-contained hopper 28 via movement of the agricultural product under the influence of gravity from the self-contained hopper 28 to the second and third singulating meters. In the illustrated embodiment, a delivery tube 156 extends from a first outlet of the self-contained hopper 28 to an inlet of the second singulating meter 158, and a delivery tube 156 extends from a second outlet of the self-contained hopper 28 to an inlet of the third singulating meter 162. During operation of the agricultural implement 10, the second and third singulating meters receive the agricultural product from the self-contained hopper 28, the second singulating meter 158 outputs substantially singulated particles of the agricultural product to the product tube 150 of the second singulating row unit 160, and the third singulating meter 162 outputs substantially singulated particles of the agricultural product to the product tube 150 of the third singulating row unit 164. Each product tube 150, in turn, directs the substantially singulated particles of the agricultural product toward a respective trench. Utilizing a single self-contained hopper to provide the agricultural product to two singulating meters may reduce the cost of the agricultural implement, as compared to utilizing a self-contained hopper for each singulating meter.

While the illustrated self-contained hopper is configured to provide the agricultural product to two singulating meters in the illustrated embodiment, in other embodiments, one self-contained hopper may provide agricultural product to more or fewer singulating meters. For example, one self-contained hopper may provide agricultural product to 1, 2, 3, 4, 5, 6, 7, 8, or more singulating meters. In addition, while the delivery tubes 156 are coupled to respective outlets of the self-contained hopper 28 in the illustrated embodiment, in other embodiments, the self-contained hopper 28 may include a single outlet, and the agricultural product may be split among multiple delivery tubes by a flow divider. Furthermore, while each singulating meter 30 is coupled to a respective singulating row unit 142 in the illustrated embodiment, in other embodiments, at least one of the singulating meters may be coupled to the frame element and/or the self-contained hopper.

In the illustrated embodiment, a fourth singulating meter 166 is coupled to a self-contained hopper 28 and configured to provide substantially singulated particles of the agricultural product to a fourth singulating row unit 168 and a fifth singulating row unit 170. The fourth singulating meter 166 is configured to receive the agricultural product from a self-contained hopper 28 via movement of the agricultural product under the influence of gravity from the self-contained hopper 28 to the fourth singulating meter 166. A valve assembly 172 is coupled to the fourth singulating meter 166, a delivery tube 156 extends from a first outlet of the valve assembly 172 to the product tube 150 of the fourth singulating row unit 168, and a delivery tube 156 extends from a second outlet of the valve assembly 172 to the product tube 150 of the fifth singulating row unit 170. During operation of the agricultural implement 10, the fourth singulating meter 166 receive the agricultural product from the self-contained hopper 28, and the fourth singulating meter 166 outputs substantially singulated particles of the agricultural product to the valve assembly 172. The valve assembly 172 alternatingly directs the substantially singulated particles of the agricultural product to the product tube 150 of the fourth singulating row unit 168 and the product tube 150 of the fifth singulating row unit 170 via respective delivery tubes 156. For example, the fourth singulating meter 166 may output the substantially singulated particles of the agricultural product at twice a target rate, and the valve assembly 172 may direct alternating particles to the product tube 150 of each singulating row unit 142. Each product tube 150, in turn, directs the substantially singulated particles of the agricultural product toward a respective trench. Utilizing a single self-contained hopper and a single singulating meter for two singulating row units may reduce the cost of the implement, as compared to utilizing a singulating meter for each singulating row unit.

While the valve assembly 172 is configured to provide the substantially singulated particles of the agricultural product to two singulating row units in the illustrated embodiment, in other embodiments, the valve assembly may provide substantially singulated particles to more or fewer singulating row units (e.g., 1, 2, 3, 4, 5, 6, 7, 8, or more). In such embodiments, the speed of the singulating meter may be controlled based on the target flow rate of the agricultural product and the number of singulating row units supplied by the valve assembly. Furthermore, while the fourth singulating meter 166 is coupled to a respective self-contained hopper 28 in the illustrated embodiment, in other embodiments, the singulating meter may be coupled to the frame element of the agricultural implement frame. In addition, while the valve assembly 172 is coupled to the fourth singulating meter 166 in the illustrated embodiment, in other embodiments, the valve assembly may be coupled to the self-contained hopper and/or the frame element of the agricultural implement frame. While the illustrated agricultural implement includes three different singulating row unit/singulating meter configurations, in other embodiments, the agricultural implement may include any one or more of these configurations. Furthermore, while each self-contained hopper is coupled to the frame element of the agricultural implement frame in the illustrated embodiment, in other embodiments, at least one self-contained hopper may be coupled to a respective singulating row unit. For example, a self-contained hopper may be coupled to a respective singulating row unit, and a respective singulating meter may be coupled to the agricultural implement frame independently of the singulating row unit.

Figure 5:
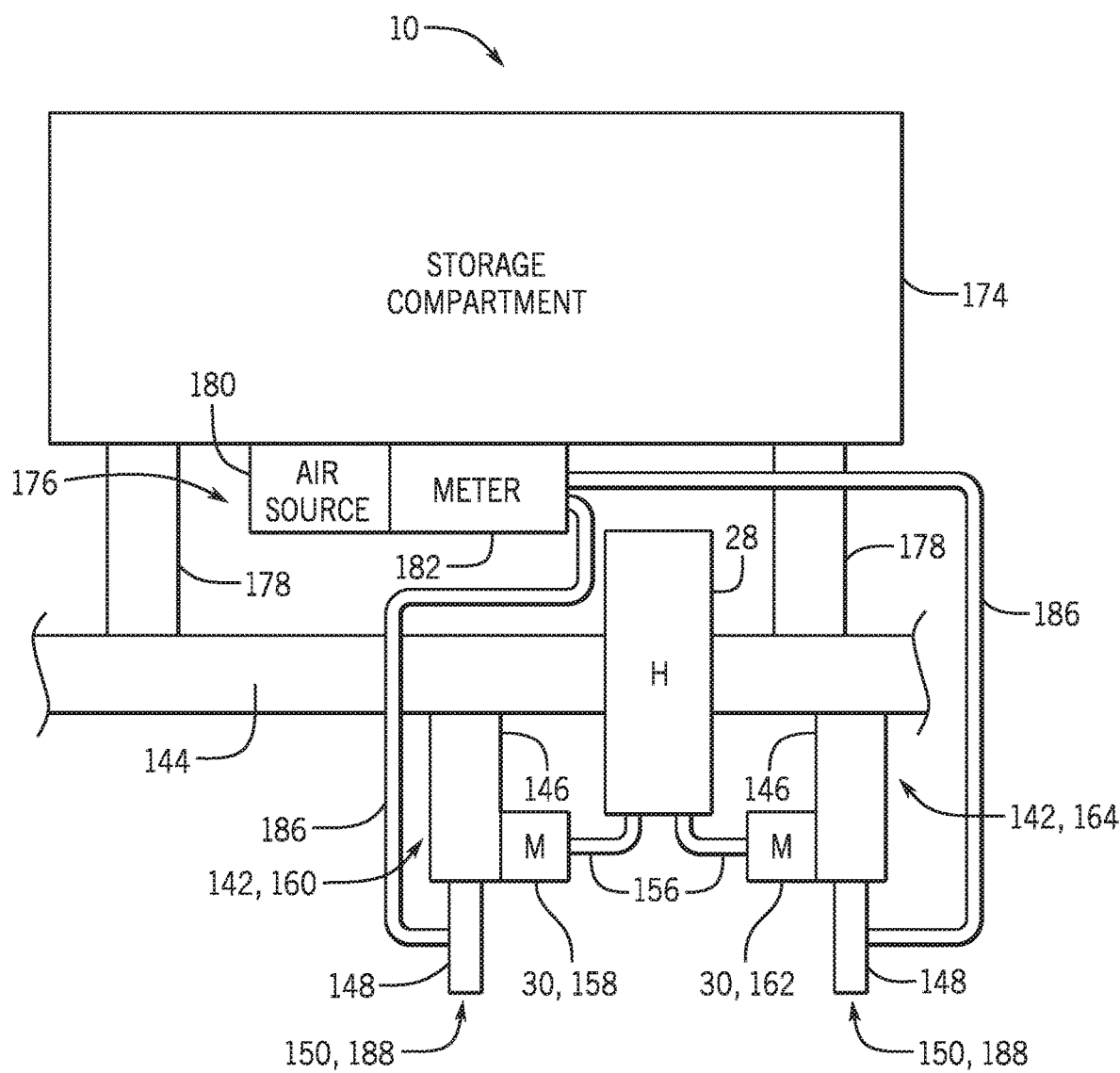
FIG. 5 is a schematic diagram of another embodiment of an agricultural implement having multiple singulating row units arranged along a frame element of the agricultural implement.

FIG. 5 is a schematic diagram of another embodiment of an agricultural implement 10 having multiple singulating row units 142 arranged along a frame element 144 of the frame of the agricultural implement. The second and third singulating meters, and the second and third singulating row units disclosed above with reference to FIG. 4 are included in the illustrated agricultural implement. However, any of the singulating row units/singulating meters disclosed herein may be utilized with the storage compartment and pneumatic distribution system described below.

In the illustrated embodiment, the second singulating meter 158 is coupled to the second singulating row unit 160, and the third singulating meter 162 is coupled to the third singulating row unit 164. The second singulating meter 158 and the third singulating meter 162 are configured to receive the agricultural product from a common self-contained hopper 28 via movement of the agricultural product under the influence of gravity from the self-contained hopper 28 to the second and third singulating meters. In the illustrated embodiment, a delivery tube 156 extends from a first outlet of the self-contained hopper 28 to an inlet of the second singulating meter 158, and a delivery tube 156 extends from a second outlet of the self-contained hopper 28 to an inlet of the third singulating meter 162. During operation of the agricultural implement 10, the second and third singulating meters receive the agricultural product from the self-contained hopper 28, the second singulating meter 158 outputs substantially singulated particles of the agricultural product to the product tube 150 of the second singulating row unit 160, and the third singulating meter 162 outputs substantially singulated particles of the agricultural product to the product tube 150 of the third singulating row unit 164. Each product tube 150, in turn, directs the substantially singulated particles of the agricultural product toward a respective trench.

In the illustrated embodiment, the agricultural implement 10 includes a storage compartment 174 and a pneumatic distribution system 176. The storage compartment 174 is configured to store a second agricultural product (e.g., fertilizer, etc.), and the pneumatic distribution system 176 is configured to convey the second agricultural product to the second and third singulating row units. In the illustrated embodiment, the storage compartment 174 is coupled to the frame element 144 of the agricultural implement frame by support members 178. However, in alternative embodiments, the storage compartment may be coupled to the agricultural implement frame at any suitable location using any suitable mounts (e.g., independently of the singulating row units and/or the self-contained hopper(s)). Furthermore, in certain embodiments, the storage compartment and/or at least a portion of the pneumatic distribution system may be coupled to the frame of a separate implement (e.g., air cart) that is towed in line with the illustrated agricultural implement.

In the illustrated embodiment, the pneumatic distribution system 176 includes an air source 180, a product meter 184, and distribution lines 186. The product meter 184 (e.g., including meter roller(s)) is configured to receive the second agricultural product from the storage compartment 174 and to output metered agricultural product to an airflow provided by the air source 180. The airflow fluidizes and directs the second agricultural product through the distribution lines 186 to the second and third singulating row units. In certain embodiments, each distribution line 186 is coupled to the product tube 150 of a respective singulating row unit 142. In such embodiments, the substantially singulated particles of the first agricultural product mix with the second agricultural product in the product tube. In further embodiments, at least one singulating row unit 142 includes a second product tube 188, and the second product tube 188 is coupled to a respective distribution line 186. In such embodiments, the second product tube 188 receives the second agricultural product from the respective distribution line 186 and directs the second agricultural product to the trench.

In certain operating configurations, the singulating meters may provide substantially singulated particles of the first agricultural product to the singulating row units (e.g., for planting canola seeds). In other operating configurations, the pneumatic distribution system may provide the second agricultural product to the singulating row units (e.g., for planning soybean seeds). In further operating configurations, the singulating meters may provide the substantially singulated particles of the first agricultural product to the singulating row units, and the pneumatic distribution system may provide the second agricultural product to the singulating row units (e.g., for planting seeds and fertilizer). Furthermore, in certain embodiments, the agricultural implement may include multiple storage compartments (e.g., in combination with multiple pneumatic distribution systems) to provide multiple secondary agricultural products to one or more singulating row units.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement comprising:
a frame;
a singulating row unit coupled to the frame;
a self-contained hopper coupled to the frame independently of the singulating row unit, wherein the self-contained hopper is configured to store an agricultural product, and the self-contained hopper is not configured to receive the agricultural product from a supply container coupled to the agricultural implement; and
a singulating meter configured to receive the agricultural product from the self-contained hopper via movement of the agricultural product under the influence of gravity from the self-contained hopper to the singulating meter, wherein the singulating meter is configured to output substantially singulated particles of the agricultural product;
wherein the singulating row unit comprises a ground-engaging tool configured to open a trench within soil, and the singulating row unit comprises a product tube configured to receive the substantially singulated particles of the agricultural product from the singulating meter and to direct the substantially singulated particles of the agricultural product toward the trench.

2. The agricultural implement of claim 1, wherein the singulating meter is coupled to the frame independently of the singulating row unit.

3. The agricultural implement of claim 1, wherein the singulating meter is coupled to the singulating row unit.

4. The agricultural implement of claim 1, wherein the ground-engaging tool comprises an opener or a disc blade.

5. The agricultural implement of claim 1, wherein the singulating row unit comprises a packer wheel positioned behind the product tube relative to a direction of travel of the agricultural implement, and the packer wheel is configured to pack the soil onto the agricultural product disposed within the trench.

6. The agricultural implement of claim 1, comprising:
a second singulating meter configured to receive the agricultural product from the self-contained hopper via movement of the agricultural product under the influence of gravity from the self-contained hopper to the second singulating meter, wherein the second singulating meter is configured to output second substantially singulated particles of the agricultural product; and
a second singulating row unit coupled to the frame independently of the self-contained hopper, wherein the second singulating row unit comprises a second ground-engaging tool configured to open a second trench within the soil, and the second singulating row unit comprises a second product tube configured to receive the second substantially singulated particles of the agricultural product from the second singulating meter and to direct the second substantially singulated particles of the agricultural product toward the second trench.

7. The agricultural implement of claim 1, comprising:
a second singulating row unit coupled to the frame independently of the self-contained hopper, wherein the second singulating row unit comprises a second ground-engaging tool configured to open a second trench within the soil, and the second singulating row unit comprises a second product tube configured to receive the substantially singulated particles of the agricultural product from the singulating meter and to direct the substantially singulated particles of the agricultural product toward the second trench; and
a valve assembly configured to receive the substantially singulated particles of the agricultural product from the singulating meter and to alternatingly direct the substantially singulated particles of the agricultural product to the product tube of the singulating row unit and the second product tube of the second singulating row unit.

8. The agricultural implement of claim 1, comprising a storage compartment and a pneumatic distribution system, wherein the storage compartment is configured to store a second agricultural product, and the pneumatic distribution system is configured to convey the second agricultural product to the product tube of the singulating row unit or to a second product tube of the singulating row unit.

9. An agricultural implement comprising:
a frame;
a plurality of singulating row units coupled to the frame;
at least one self-contained hopper coupled to the frame independently of the plurality of singulating row units, wherein the at least one self-contained hopper is configured to store an agricultural product, and the at least one self-contained hopper is not configured to receive the agricultural product from a supply container coupled to the agricultural implement; and
at least one singulating meter configured to receive the agricultural product from the at least one self-contained hopper via movement of the agricultural product under the influence of gravity from the at least one self-contained hopper to the at least one singulating meter, wherein the at least one singulating meter is configured to output substantially singulated particles of the agricultural product;
wherein each singulating row unit of the plurality of singulating row units comprises a ground-engaging tool configured to open a respective trench within soil, and the singulating row unit comprising a product tube configured to receive the substantially singulated particles of the agricultural product and to direct the substantially singulated particles of the agricultural product to the respective trench.

10. The agricultural implement of claim 9, wherein the at least one self-contained hopper comprises a plurality of self-contained hoppers, the at least one singulating meter comprises a plurality of singulating meters, each singulating meter of the plurality of singulating meters is configured to receive the agricultural product from a respective self-contained hopper of the plurality of self-contained hoppers, and the product tube of each singulating row unit of the plurality of singulating row units is configured to receive the substantially singulated particles of the agricultural product from a respective singulating meter of the plurality of singulating meters.

11. The agricultural implement of claim 9, wherein the at least one singulating meter comprises a plurality of singulating meters, each singulating meter of the plurality of singulating meters is configured to receive the agricultural product from the at least one self-contained hopper, and the product tube of each singulating row unit of the plurality of singulating row units is configured to receive the substantially singulated particles of the agricultural product from a respective singulating meter of the plurality of singulating meters.

12. The agricultural implement of claim 9, comprising a valve assembly configured to receive the substantially singulated particles of the agricultural product from the at least one singulating meter and to alternatingly direct the substantially singulated particles of the agricultural product to the product tube of each respective singulating row unit of the plurality of singulating row units.

13. The agricultural implement of claim 9, comprising a storage compartment and a pneumatic distribution system, wherein the storage compartment is configured to store a second agricultural product, and the pneumatic distribution system is configured to convey the second agricultural product to the product tube or a second product tube of at least one singulating row unit of the plurality of singulating row units.

14. The agricultural implement of claim 9, wherein the at least one singulating meter is coupled to the frame independently of the plurality of singulating row units, or the at least one singulating meter is coupled to at least one respective singulating row unit of the plurality of singulating row units.

15. The agricultural implement of claim 9, wherein the ground-engaging tool comprises an opener or a disc blade.

16. An agricultural implement comprising:
a frame;
a singulating row unit coupled to the frame;
a self-contained hopper coupled to the frame independently of the singulating row unit, wherein the self-contained hopper is configured to store a first agricultural product, and the self-contained hopper is not configured to receive the first agricultural product from a supply container coupled to the agricultural implement;
a singulating meter configured to receive the first agricultural product from the self-contained hopper via movement of the first agricultural product under the influence of gravity from the self-contained hopper to the singulating meter, wherein the singulating meter is configured to output substantially singulated particles of the first agricultural product; and
a storage compartment and a pneumatic distribution system, wherein the storage compartment is configured to store a second agricultural product, and the pneumatic distribution system is configured to output the second agricultural product;
wherein the singulating row unit comprises a ground-engaging tool configured to open a trench within soil, and wherein the singulating row unit comprises at least one product tube configured to receive the substantially singulated particles of the first agricultural product from the singulating meter, to receive the second agricultural product from the pneumatic distribution system, and to direct the substantially singulated particles of the first agricultural product and the second agricultural product toward the trench.

17. The agricultural implement of claim 16, wherein the pneumatic distribution system comprises an air source and a product meter, the product meter is configured to control a flow rate of the second agricultural product to the singulating row unit, and the air source is configured to output an airflow configured to fluidize the second agricultural product output from the product meter.

18. The agricultural implement of claim 16, wherein the storage compartment is coupled to the frame independently of the singulating row unit and the self-contained hopper.

19. The agricultural implement of claim 16, wherein the singulating meter is coupled to the singulating row unit.

20. The agricultural implement of claim 16, wherein the at least one product tube comprises a first product tube and a second product tube, the first product tube is configured to receive the substantially singulated particles of the first agricultural product from the singulating meter, and the second product tube is configured to receive the second agricultural product from the pneumatic distribution system.

* * * * *